Sept. 19, 1961 H. E. HANSEN ET AL 3,000,428
ARTICULATED SHAPING TOOL FOR PRESSING SHEET
MATERIAL ONTO A COUNTER SURFACE
Filed March 15, 1956 2 Sheets-Sheet 1

INVENTORS
HERMAN E. HANSEN &
ROGER K. AUSTIN
BY Campbell, Brumbaugh, Free & Graves
their ATTORNEYS

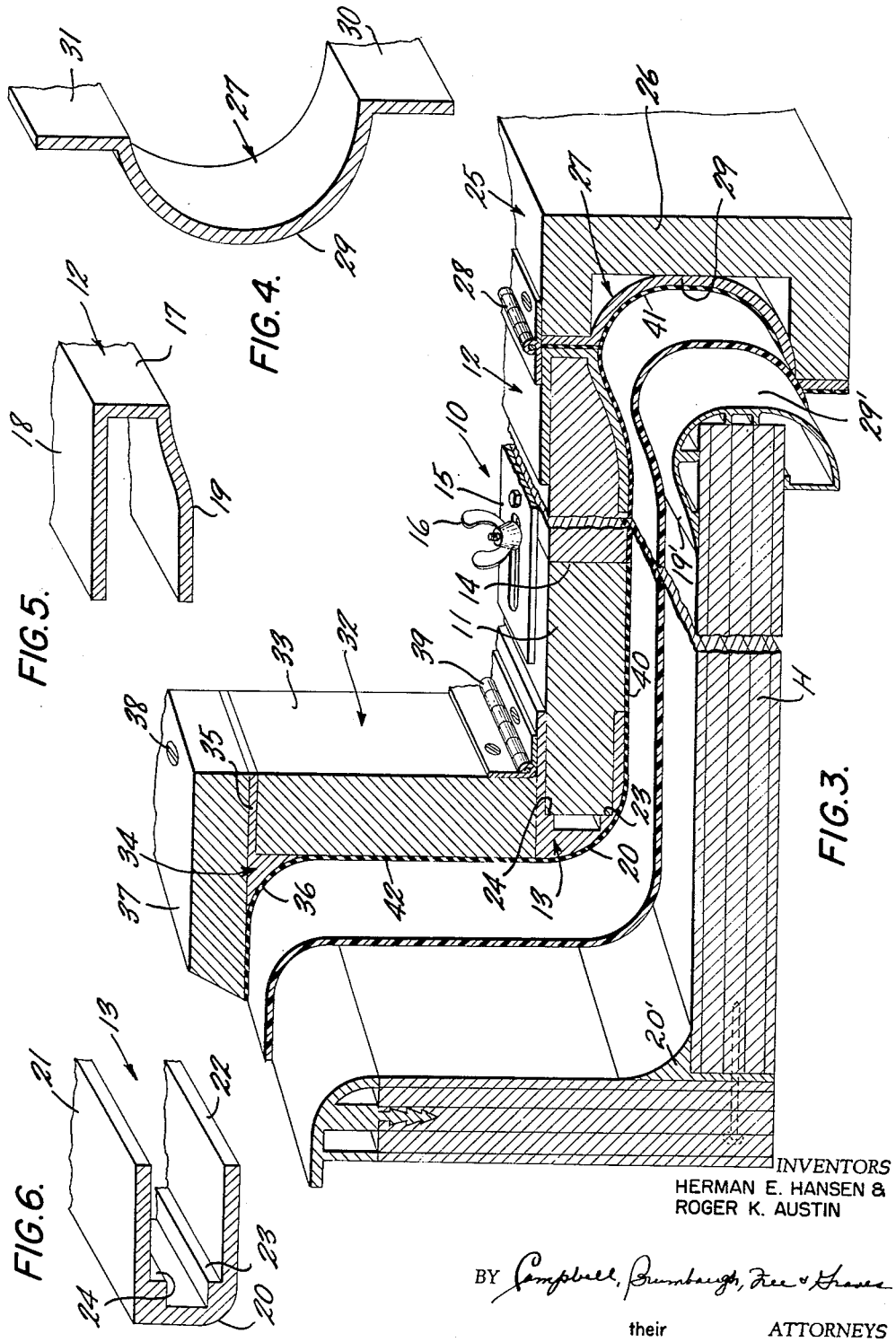

United States Patent Office 3,000,428
Patented Sept. 19, 1961

3,000,428
ARTICULATED SHAPING TOOL FOR PRESSING SHEET MATERIAL ONTO A COUNTER SURFACE
Herman E. Hansen, Winterton, N.Y., and Roger K. Austin, Deal, N.J., assignors to Congoleum-Nairn Inc., Kearny, N.J., a corporation of New York
Filed Mar. 15, 1956, Ser. No. 571,653
5 Claims. (Cl. 154—1)

This invention relates to an apparatus for making counters, in particular counters having exposed or wear surfaces of sheet material permanently bonded to a counter sub-structure.

In the copending application, Serial No. 571,689, filed March 15, 1956, now U.S. Patent 2,890,919, there is disclosed a counter construction which utilizes sub-structure form pieces and water-impervious coverings to achieve a highly effective and inexpensive counter construction.

In accordance with the present invention, there is provided an articulated matrix for applying a single sheet of thin surfacing material to a smooth continuous subsurface, which can include a flat back splash having a rounded top edge, a flat horizontal counter panel, a rounded cove at the junction between the horizontal panel and the back splash, and an enlarged, rounded front edge on the horizontal panel. The matrix can include pressing surfaces complementary to each of the three rounded surfaces described above as well as to the two flat surfaces. The pressing surfaces of the matrix are adapted to be brought into pressing opposition to the sub-structure surfaces with the sheet of surfacing material disposed therebetween to be adhesively bonded in intimate relationship throughout its entire surface area to the sub-structure. In the application of sheet material to a sub-structure to make a counter, the back of the sheet of surfacing material, as well as the sub-structure on which it is to be mounted, are completely covered with adhesive and the sheet pressed into intimate contact with the sub-structure working generally from a central portion outwardly in both directions until full contact is established, and maintaining pressure throughout until the adhesive has set.

For a more complete understanding of the present invention reference can be made to the detailed description which follows and to the accompanying drawings in which:

FIGURE 3 is a view in perspective of the matrix of FIGURE 1 and of the counter assembly with the matrix and parts of the counter assembly successively broken away in vertical section to show the matrix in its full operative position on the counter assembly;

FIGURE 4 is a view in perspective with its left hand end in vertical section of a short length of a front edge forming piece of the matrix showing one of the front edge forming pieces of the matrix;

FIGURE 5 is a view similar to FIGURE 4 showing another front edge forming piece of the matrix; and FIGURE 6 is a view similar to FIGURE 4 showing the cove forming piece of the matrix.

Figure 1:
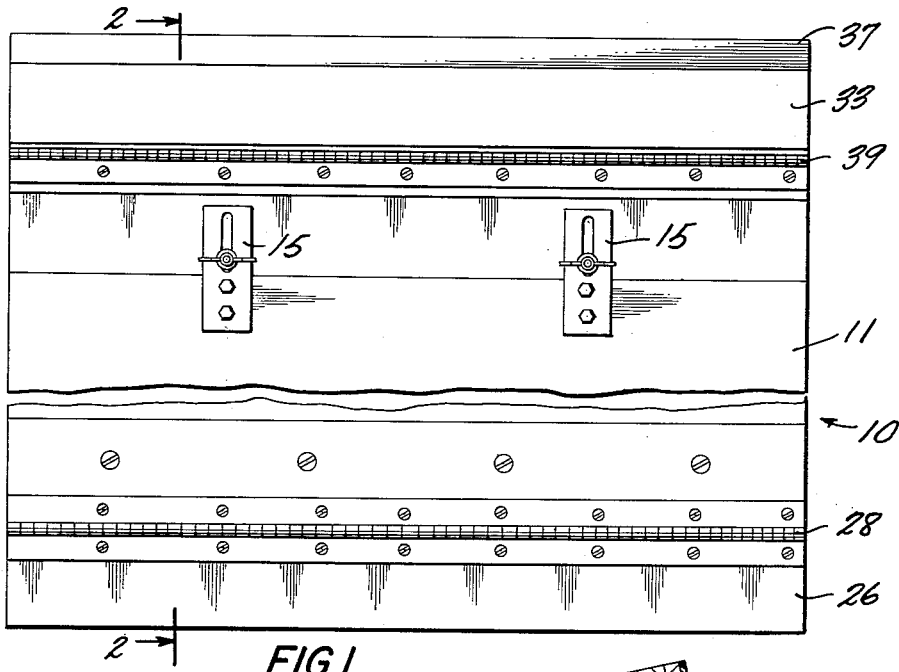
FIGURE 1 is a foreshortened plan view of a matrix or tool useful in fabricating a counter assembly.

As will be apparent from the following description and from a reading of said copending application, Serial No. 571,689, filed March 15, 1956, the apparatus of the present invention is generally applicable to the fabrication, either on the site of installation or in a shop, of counters such as kitchen counters, bar tops, table tops, or the like. It has particular utility in the construction of sink and cabinet tops for kitchens wherein the counter surface is provided with an upright back splash as indicated in the accompanying drawings.

Referring now to the drawings, there is shown a matrix or tool indicated generally by the numeral 10. The matrix 10 includes a central horizontal panel section 11 which is preferably composed of a panel of plywood or the like having a contoured feather edge form piece 12 attached to its forward end portion and a contoured cove forming piece 13 attached to its rear end portion. The horizontal section 11 can be made lengthwise adjustable within limits by means of a suitable expansion joint 14, including slotted coupling straps 15 and wing nuts 16. In this fashion a range of tolerance for the depth of the horizontal base panel H of the counter is provided. The feather edge form piece 12 is of general U-shaped configuration in cross section and includes, as best seen in FIGURE 5, a bight wall 17 and a pair of leg walls 18 and 19 extending from opposite ends of the bight wall to receive the leading edge of the horizontal panel section 11. The leg wall 19 is suitably convexly curved so as to generally conform to the concave feather edge portion 19' of the front edge form piece of the counter.

The cove forming piece 13 of the matrix is also generally U-shaped in cross section and includes, as best seen in FIGURE 6, a bight wall 20 having leg walls 21 and 22 extending from opposite ends thereof to receive the trailing edge of the horizontal panel section 11. Adjacent the connection of the two leg walls with the bight wall, there are provided shoulders 23 and 24, respectively. The exterior surface of the bight wall 20 is convexly curved so as to generally conform with the exterior concave surface of the cove forming piece 20' of the counter.

A front edge section 25 of the matrix 10 is pivotally mounted to the forward end portion of the horizontal panel section 11 and comprises a generally U-shaped channel 26 within which a contoured front edge forming piece 27 is secured. As best shown in FIGURE 3, sections 11 and 25 are joined in a pivotal connection by means of hinge means such as a piano hinge 28 secured to the upper surface of the central section panel through the leg wall 18 of the feather-edge form piece 12 and the upper surface of the front edge section 25. The front edge form piece 27, as seen in FIGURE 4, includes a central curved portion 29 having an exterior concave surface conforming to the convex exterior surface of the front edge form piece 29' of the counter and flanges 30 and 31 extending from the respective ends of the curved portion. The flanges are adapted to be secured to the ends of the U-shaped section 26, as by countersink for example.

Pivoted near the trailing or rear of the horizontal section 11 is a back splash section 32 including, an upright panel member 33 having a contoured top form piece 34 secured to its upper edge. The form piece 34 includes a flange 35 which abuts the upper edge of the panel member 33 and a body portion which has a concavely curved exterior surface 36 terminating in feather edges. An upper horizontal section 37 is secured to the upright panel member 33 as by screws 38, for example, in abutting relation to the flange 35 of the form piece 34 and extends rearwardly therefrom. The back splash section 32 is pivoted to the central section 11 by means of suitable hinge means such as, a piano hinge 39 suitably fastened to the upper surface of the central section panel through the leg 21 of the cove forming piece and the forward surface of the lower end of the upright panel member 33.

Figure 2:
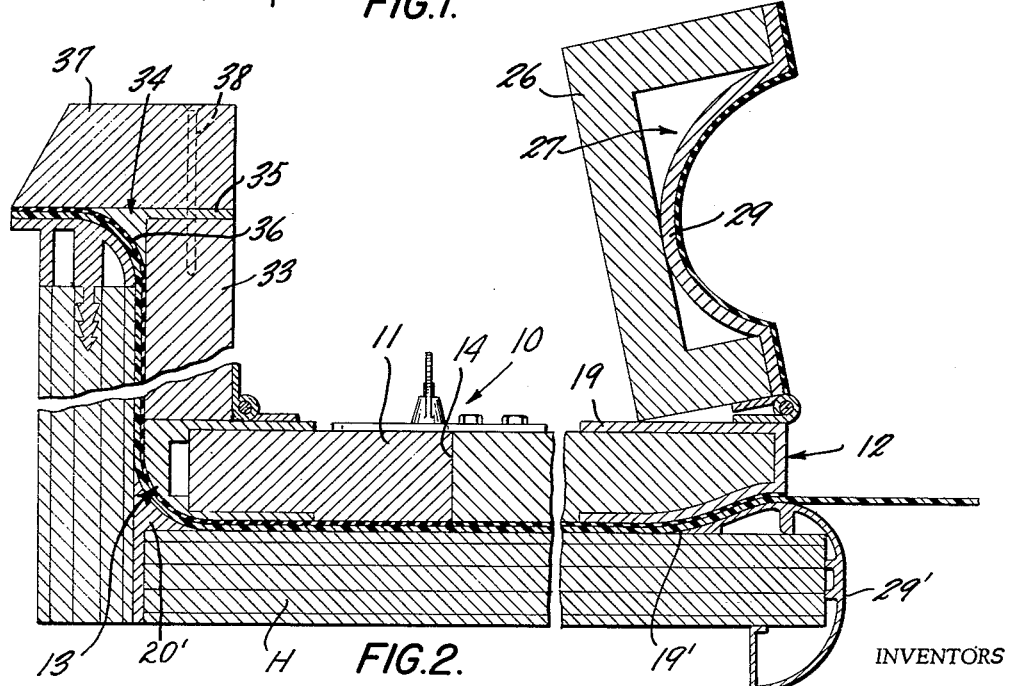
FIGURE 2 is a view in vertical section of the matrix of FIGURE 1 showing the arrangement of the matrix at an intermediate stage of construction of the counter assembly.

As shown in FIGURES 2 and 3, the sheet engaging surface of the matrix sections 11, 25 and 32 may be covered by sheets 40, 41 and 42, respectively, which are made of resilient material such as rubber or the like. These cover sheets are by no means essential and may be readily eliminated if desired since the use of metallic moulding strips in conjunction with the panels provides a smooth, continuous surface which can be accurately formed.

In applying a sheet material such as vinyl plastic to a counter surface constructed with the panels and form pieces as described above, the following procedure is carried out. First, the sheet is fitted to the surface of the counter for centering and measuring, at which time suitable marks are made on the sheet and the exterior counter surface so that when the sheet is subsequently applied to the counter surface, accurate registry is assured. It will be understood that this step is preferable but is not essential to the present method. Also, it will be understood that the sheet-applying operating can be carried out before or after the counter assembly is in its final location.

Next, a suitable adhesive is applied between the exterior counter surface and the under surface of the sheet, preferably by applying the adhesive separately to both surfaces. Any appropriate adhesive may be utilized, preferably epoxy resins made by reacting epichlorhydrin with a polyhydric phenol or polyhydric alcohol. Specifically, this material may comprise epichlorhydrin condensed with bisphenol A. Typical resins are shown in Patent Nos. 2,500,600; 2,500,449; 2,324,483 and 2,444,333.

After the adhesive has been applied between the exterior counter surface and the under surface of the sheet, the latter is brought into registry with the former and the central section of the matrix is engaged with the exterior surface of the sheet. Suitable C clamps (not shown) are then applied to the central section of the matrix and the horizontal panel so as to apply a surface pressure to the vinyl plastic sheet substantially throughout the entire portion thereof corresponding to the horizontal surface of the counter. It will be noted that the forward end portion of the vinyl plastic sheet will overhang the front edge forming piece of the counter, while the rearward portion will be directed upwardly.

After the central section of the matrix has been suitably clamped in position, the front edge section of the matrix is then pivoted into contact with the overhanging front end of the sheet. Further pivoting of the front edge section will cause the overhanging end of the vinyl plastic sheet to engage the convex surface of the front forming piece. It will be noted that by moving the overhanging end of the sheet with the front edge section of the matrix in this manner, the under surface of the overhanging edge will engage the convexly curved exterior surface of the front edge of the counter progressively toward the front edge of the sheet, thus eliminating the possibility of trapping air therebetween. When the entire overhanging end of the sheet has been moved into contact with the front edge surface of the counter, suitable clamps are then applied to the front edge section of the matrix so as to apply a surface pressure throughout the front end portion of the plastic sheet.

Next, the back splash section is moved rearwardly into engagement with the rear end portion of the sheet. During this movement, the back splash section of the matrix will initially engage the rear end of the sheet, which is disposed substantially vertically, and upon subsequent movement will cause the sheet to progressively contact the convex exterior surface of the back splash moulding toward the rear edge of the sheet. After the back splash section has caused the sheet to completely engage the back splash exterior surface of the counter, suitable clamps are applied to the back splash section so as to apply a surface pressure throughout the entire rear end of the sheet.

It will be understood that the order in which the matrix sections are applied and clamped is not critical and that any order may be utilized if desired. However, since the central section is considerably more bulky than the front edge or back splash section, it has been found preferable to apply this section first. Furthermore, by applying the central section first, the progressive contact of the front and rear end portions of the sheet is more easily carried out as noted above. With the utilization of the matrix of the present invention, the adhesive-applied surface of the sheet is brought into contact with the adhesive-applied exterior surface of the counter from the center toward each end so as to eliminate the possibility of creating air pockets or voids. Moreover, by applying a pressure which extends over the entire surface of the sheet, an effective adhesion results which is completely free of air pockets or the like. It should also be noted that this superior adhesion is greatly facilitated by the utilization of a counter surface which is smooth and continuous as provided by the construction of panels and forming pieces as described above.

With all of the sections of the matrix thus clamped in pressure applying relation, the entire assembly is maintained in that condition until such time as the adhesive has set. The clamps may then be loosened and the matrix removed to reveal a finished counter.

Another example of a material which can be utilized in conjunction with the present invention, is the so-called C-stage plastic materials of the type comprising laminated sheets, such as, for example, paper woven fabric and matter or woven glass fibers impregnated with any suitable thermosetting resin such as phenol urea melamine formaldehyde resins and their derivatives including the group of unsaturated polyester resins, e.g., ethylene glycolmaleate acid, polymer modified with monomeric styrene. Such plastics are commercially available as "Formica" which is the trademark of a product of the Formica Company of Cincinnati, Ohio, "Micarta" which is the trademark of a product of the Westinghouse Electric and Manufacturing Company of Pittsburgh, Pennsylvania, or "Farlite" which is the trademark of a product of Farley and Loetscher of Dubuque, Iowa.

In general, the C-stage plastic laminates cannot be bent to conform with a counter surface such as presently disclosed without the application of heat. Accordingly, where such plastics are utilized it is desirable to pre-form the sheet into the shape of the exterior surface of the counter. After the C-stage plastic sheet has been pre-formed, suitable adhesives of the type mentioned above are then applied in the same manner as previously indicated. The sheet is then engaged to the counter surface and the matrix applied and clamped in the manner indicated before.

It will be appreciated that various modifications can be made in the invention as described above without in any way deviating from the scope thereof as defined in the appended claims.

We claim:
1. A portable articulated shaping tool having a matrix press surface of curvilinear profile composed of three sections for pressing a thin, flexible sheet to a smooth, continuous counter surface which has a convex front edge surface, a main horizontal counter surface, a concave rear cove surface, and an upright backsplash surface, said shaping tool comprising a main section having a bottom matrix surface complementary to said main horizontal counter surface, a backsplash section having a rear matrix surface complementry to the backsplash surface of said counter, hinge means connecting said backsplash section to the main section for pivotal movement to an upright position at the rear end of the main section, said backsplash section in upright position and said main section in position on the main horizontal counter surface cooperating to define a continuous matrix surface of curvilinear profile complementary to the horizontal, rear cove and upright surfaces of the counter, a front edge section having a rear concave matrix surface complementary to the convex front edge surface of the counter, and hinge means connecting the front edge section to the main section for pivotal movement to a downwardly depending position at the front end of the main section, said front edge section in downwardly depending position and said main section cooperating to define a continuous matrix surface of curvilinear profile complementary to the main horizotal and the convex front edge surfaces of the counter.

2. An articulated shaping tool as set forth in claim 1 in which said main section comprises front and rear components adjustable relative to each other to accommodate variations in the distance between the front edge surface and the cove surface of the counter surface and including means for locking said components in fixed relation to each other.

3. An articulated shaping tool as set forth in claim 1 wherein said main section includes a molding strip secured to its rear edge, said molding strip having a convexly curved matrix surface conforming to the concavely curved rear cove counter surface, said molding strip also having an upper stop surface which engages one end of the pivoted backsplash section when the backsplash section is in operative, upstanding position.

4. An articulated shaping tool as set forth in claim 1 wherein said main section includes a molding strip secured to its forward edge, said molding strip having a lower matrix surface conforming to the upper portion of said front edge counter surface and a front stop surface which engages a rear surface of the pivoted front edge section when the front edge section is in operative downwardly depending position.

5. A portable articulated shaping tool for pressing a thin, flexible sheet to a smooth, continuous counter surface which has a convexly curved front edge surface, a main horizontal counter surface, a concavely curved rear cove surface and an upright backsplash surface, said shaping tool comprising a main section having a bottom matrix surface complementary to said counter surface, a backsplash section having a rear matrix surface complementary to said backsplash surface, hinge means connecting said backsplash section to the rear end portion of said main section for pivotal movement between an inoperative position overlying the main section and an upstanding operative position, means forming part of said backsplash section which contacts a companion part of the main section to limit the rearward pivotal movement of the backsplash section with respect to the main section, said backsplash section in upright, operative position and said main section cooperating to define a continuous matrix surface complementary with said counter surface, the concavely curved rear cove surface and the upright backsplash surface, a front edge section having a rear concavely curved matrix surface complementary to the said convexly curved front edge surface, hinge means connecting said front edge section for pivotal movement between a forwardly raised inoperative position and a downwardly depending operative position, said front edge section in downwardly depending operative position and said main section cooperating to define a continuous matrix surface complementary with said counter surface and the convexly curved front edge surface, and means forming part of said front edge section which contacts a complementary part of the main section to limit the downward and rearward pivotal movement of the front edge section with respect to the main section, said sections when in operative positions providing a smooth, continuous matrix surface corresponding with and overlying said counter surface for pressing the flexible sheet against the counter surface.

References Cited in the file of this patent

UNITED STATES PATENTS

| | | |
|---|---|---|
| 92,187 | Hann | July 6, 1869 |
| 203,896 | Dayton | May 21, 1878 |
| 482,782 | Burkhardt | Sept. 20, 1892 |
| 536,749 | Garvey | Apr. 2, 1895 |
| 1,688,232 | Harkin | Oct. 16, 1928 |
| 1,739,077 | Lisher et al. | Dec. 10, 1929 |
| 1,759,703 | Lindenborg | May 20, 1930 |
| 2,187,423 | Hyland | Jan. 16, 1940 |
| 2,189,006 | Hutchinson | Feb. 6, 1940 |
| 2,228,212 | Heintz | Jan. 7, 1941 |
| 2,253,772 | Edgren | Aug. 26, 1941 |
| 2,451,702 | Weigand | Oct. 19, 1948 |
| 2,455,055 | Gray | Nov. 30, 1948 |
| 2,500,895 | Davies | Mar. 14, 1950 |
| 2,594,516 | Swisher | Apr. 29, 1952 |
| 2,648,370 | Beach | Aug. 11, 1953 |
| 2,661,789 | Keller | Dec. 8, 1953 |
| 2,671,493 | Olson | Mar. 9, 1954 |
| 2,688,523 | Norman et al. | Sept. 14, 1954 |
| 2,739,636 | Tyler | Mar. 27, 1956 |
| 2,744,850 | Schofield | May 8, 1956 |
| 2,804,909 | Hammer | Sept. 3, 1957 |

FOREIGN PATENTS

| 12,791 | Great Britain | 1849 |